J. W. BRYCE.
WEIGHING SCALE.
APPLICATION FILED JAN. 20, 1917.

1,279,646.

Patented Sept. 24, 1918.
2 SHEETS—SHEET 1.

INVENTOR
James W. Bryce
BY
Kerr, Page, Cooper & Hayward
ATTORNEYS

J. W. BRYCE.
WEIGHING SCALE.
APPLICATION FILED JAN. 20, 1917.
1,279,646.
Patented Sept. 24, 1918.
2 SHEETS—SHEET 2.
Fig. 4,
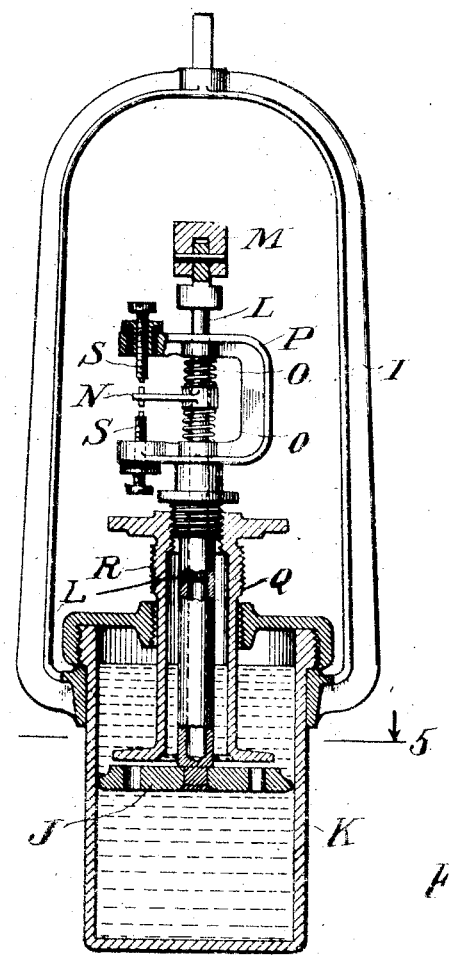
Fig. 6,
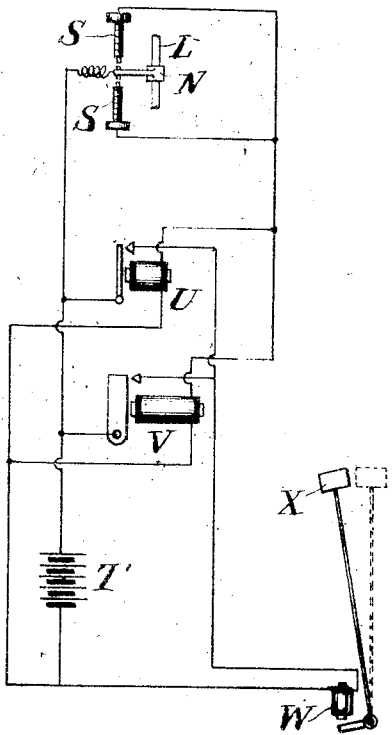
Fig. 5,
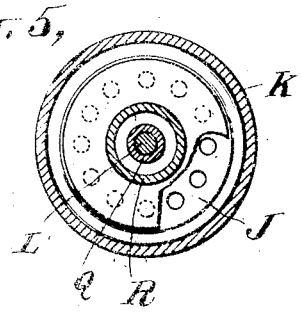
INVENTOR
James W. Bryce
BY
ATTORNEYS

UNITED STATES PATENT OFFICE.

JAMES W. BRYCE, OF BLOOMFIELD, NEW JERSEY, ASSIGNOR TO INTERNATIONAL TIME RECORDING COMPANY OF NEW YORK, OF ENDICOTT, NEW YORK, A CORPORATION OF NEW YORK.

WEIGHING-SCALE.

1,279,646.  Specification of Letters Patent.  Patented Sept. 24, 1918.

Application filed January 20, 1917. Serial No. 143,513.

*To all whom it may concern:*

Be it known that I, JAMES W. BRYCE, a citizen of the United States, residing at Bloomfield, Essex county, and State of New Jersey, have invented certain new and useful Improvements in Weighing-Scales, of which the following is a full, clear, and exact description.

The present invention is an improvement in weighing scales and is designed, in general terms, to prevent the reading or the operative effect of an indication until the weighing member has come to rest. The purpose of the invention is primarily to conceal the scale indicator or pointer until all oscillation of the weighing member has ceased, but as some scales record the weight taken on them, it is important that such records be not made until the platform or pan is in perfect equilibrium, so that aside from the mere visual indication, the scale should not be capable either of displaying or recording its indications until it is at rest.

So far as I am now informed no means for accomplishing this and similar objects automatically has heretofore been proposed, so that the invention, broadly, resides in the combination with a weighing scale of an attachment for this purpose. Many forms of device might be designed to do this, once the nature and object of the invention is appreciated and understood, but in illustration of the principle I have shown herein a disk or plate carried by a pivoted arm that conceals the scale or pointer so long as the weighing member is in movement of oscillation, but exposes it the moment that this part comes to rest.

To operate the arm I employ an electromagnet and armature in the circuit of a sluggish relay the current through which is controlled by contacts on opposite sides of an oscillating member of the weighing device and also in a circuit controlled by a sensitive relay which closes such circuit through the magnet instantly and rapidly. The sluggish relay does not have time to become demagnetized between breaks by the contacts due to oscillation and is not demagnetized until such oscillations finally cease.

This arrangement involves certain constructive details of novel character which will be more fully described by reference to the accompanying drawings:—

Fig. 4 is a view in elevation and part section of the circuit controlling mechanism.

Fig. 5 is a sectional view of the same on line 5—5 of Fig. 4, and

Fig. 6 is a diagram of circuit connections.

Figure 1:
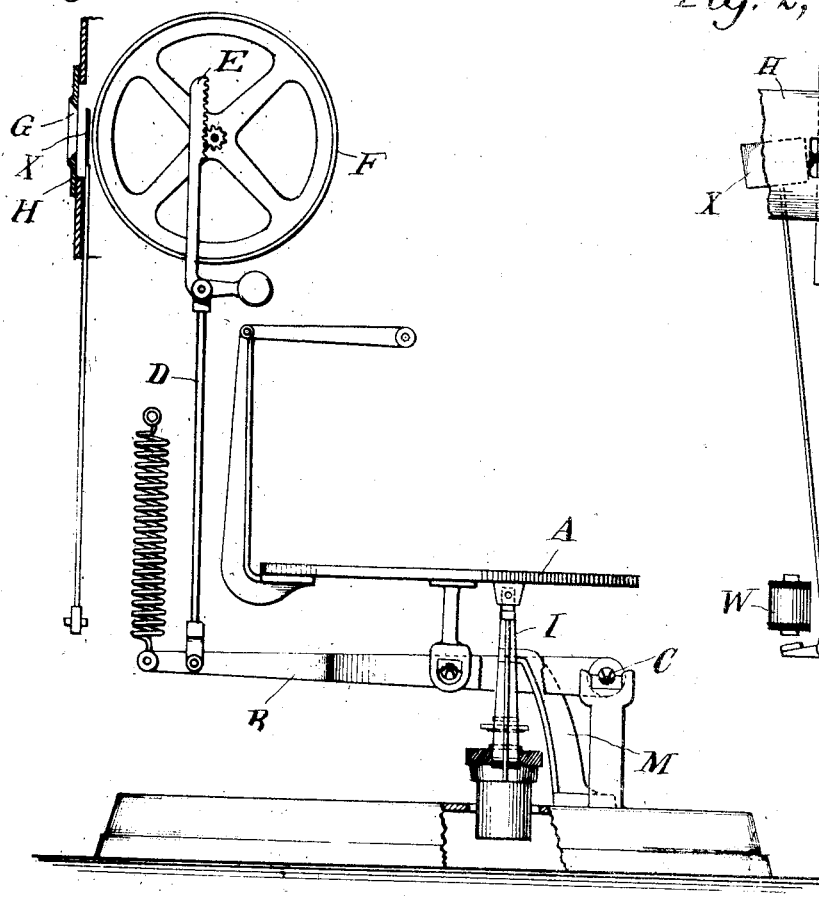
Figure 1 is a view partly in elevation and partly in section of the complete weighing scale.
Figure 2:
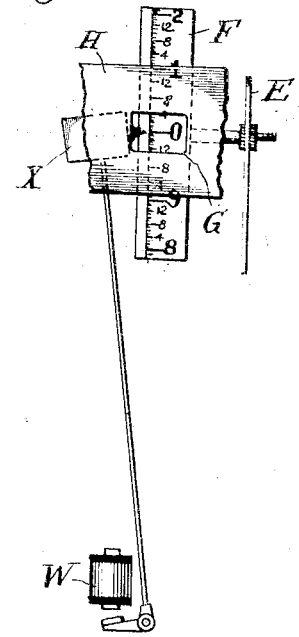
Fig. 2 is an enlarged view of the pointer and that portion of the scale where it indicates weights.
Figure 3:
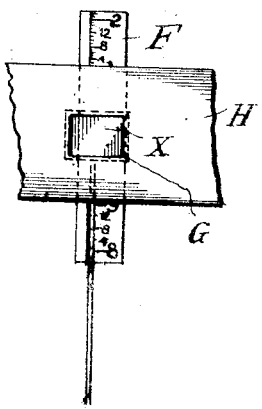
Fig. 3 is a similar view of the same parts with the indications concealed.

The character of the weighing scale is largely immaterial. That shown comprises a weighing platform A mounted on a spring supported by beam B pivoted at C and connected by a rod D with a rack E that engages with a pinion on and rotates the graduated disk or cylinder F. The proper part of this cylinder is normally visible through an opening G in a plate H.

The platform A has connected with it a bracket I carrying the cylindrical member of a dash pot K, the perforated piston or plunger J of which is rigid with a movable system adapted to slide over a rod L suspended from a stationary bracket M fixed to the base of the scale.

The rod L carries a contact arm N fixedly secured to it and is surrounded by two spiral springs O which impinge upon the arms of a double bracket P rigid with the tube Q carrying the piston J. When the cylinder of the dash pot therefore is oscillated with the scale platform, a corresponding motion is imparted to the piston and its attached parts against the force of the springs O.

The rod L terminates at any convenient point in the tube Q and in order to close the dash pot when not in use or in transportation a cylindrical member R is secured to the tube Q and has external threads by which it may be screwed into the opening in the top of the dash pot when lowered out of engagement with the tube Q. The lower end of the member R has a disk or flange which lies over and not remote from the perforated piston J which facilitates the oscillation of the piston and its attachments when the dash pot is moved.

The bracket P carries two contact arms S which in the up and down movement of the bracket come into engagement with the fixed contact N and this means is utilized for concealing the weight indications or preventing the recording while any motion of the scale plaform continues. This feature is illustrated in Fig. 6.

One terminal of a battery T is connected to the contact N and from the contacts S lead two wires joined and connected to the opposite battery terminal through the coils of a sensitive relay U and a sluggish relay V. The front stops of these relays are connected to one battery terminal and the back stops to the other terminal through the magnet W which controls a lever carrying a disk X adapted to swing over the opening G in the plate H.

The operation of the device is as follows: When an article to be weighed is placed on the scale platform the latter is set in movement which is almost sure to result in more or less oscillation. Such up and down movements are imparted through the piston of the dash pot to the contact arms of the bracket P and a series of current impulses is thereby directed through the relays U and V. As a result the magnet W is energized instantly by relay U and more slowly by relay V and by means of the latter it remains energized until the oscillations of the bracket P have ceased for a long enough period to permit the relay to become deënergized. Thereupon the disk X will fall away from the opening and expose that part of the scale over which the pointer rests.

As above explained I have shown the disk X in this case as merely concealing the scale indicators until the platform has come to rest, but it is manifest that it might be used to perform any other function at such time as the particular requirements of the scale may demand.

It will also be observed that the connection of the dash pot cylinder with the scale pan or platform, while retarding its movement does not impair its sensitiveness or accuracy. Furthermore by practically disconnecting the piston from the rigid parts of the device the oscillation of the same and its connected parts is not interfered with, and no wire connections between any movable part of the scale proper and the fixed portions of the instrument are required.

What I claim is:—

1. In a weighing scale in which the platform or pan is subject to oscillation upon receipt of an article to be weighed, the combination with said platform or pan and the weight exhibiting member of the scale, of means responsive to the oscillation of said platform or pan for rendering said member ineffective as a weight indicating or recording device whenever and so long as said oscillations occur.

2. In a weighing scale in which the platform or pan is subject to oscillation on receipt of an article to be weighed, the combination with said platform or pan and a weight indicating member, of means for concealing the weight indications while such oscillations continue, the said means being sensitive to such oscillations and dependent for operation upon their continuance.

3. In a weighing scale in which the platform or pan is subject to oscillation upon receipt of an article to be weighed, the combination with said platform or pan of a graduated scale index; a cover or screen movable over that part of the same that gives the indications of weight; and means for maintaining such screen over the scale to conceal its indications while the oscillations continue, said means being sensitive to such oscillations and dependent for operation upon their continuance.

4. In a weighing scale in which the platform or pan is subject to oscillation upon receipt of an article to be weighed, the combination with said platform or pan of a graduated scale index; a cover or screen movable over that part of the same that gives the indications of weight; an electro-magnet for moving the screen to the position where it conceals such indications; a circuit including said magnet; normally open contacts also included in said circuit; and means responsive to said oscillations whereby the contacts are closed whenever and so long as the oscillations occur.

5. In a weighing scale in which the platform or pan is subject to oscillation upon receipt of an article to be weighed, the combination with said platform or pan, of means for rendering the device ineffective as a weight indicating mechanism; an electro-magnet for controlling the operation of said means; contacts on a part of the device partaking of the oscillations; circuit connections between the same and the magnet and means therein which through the instrumentality of the contacts maintain the magnet active during the continuance of the oscillations.

6. In a weighing scale of the kind described, the combination of a disk or screen such as X, an electro-magnet for operating the same, a circuit including said magnet, a quick acting and a slow acting relay for controlling said circuit, circuits including the relays and contacts therein operated by an oscillating part of the scale for energizing the relays during the continuance of the oscillations.

7. In a scale of the kind described, the combination with the platform of means for rendering the device ineffective as a weight indicating mechanism while the platform is in oscillation, including a dash pot cylinder connected with the platform, a plunger therein, a resilient support for the plunger, a circuit controlling the means for rendering the scale ineffective and contacts therein on the plunger coöperating with a fixed contact, whereby wire connections with the weighing member of the scale are avoided.

8. An attachment for weighing scales to render such scales ineffective during the oscillation of its platform or pan, comprising, in combination, a dash pot cylinder secured to the platform, a supporting rod carried by a fixed support, a plunger for the dash pot, a resilient connection between the same and the said rod, contacts carried by the plunger, coöperating with a stationary terminal, and an electric circuit which is maintained active through the instrumentality of the contacts while oscillations continue.

9. An attachment for weighing scales to render the same ineffective as a weight indicator while its platform or pan is oscillating, comprising, in combination, a dash pot cylinder adapted to be secured to the platform, a rod carried by a fixed support, a plunger in the cylinder movable over the said rod, springs supporting the plunger, a cylinder removably attached to the plunger and adapted to close the opening in the dash pot cylinder when so desired, and contacts carried by the plunger by means of which the device is operated.

10. In a weighing scale of the kind described, the combination with an index scale, and a movable screen or the like for rendering the scale ineffective during the oscillation of the scale platform, of normally open contacts and means responsive to such oscillations for closing the same whenever and so long as said oscillations occur, electric circuits, a quick acting and a slow acting relay connected therewith, and an electromagnet under the control of the two relays for operating said screen.

In testimony whereof I hereunto affix my signature.

JAMES W. BRYCE.